(12) United States Patent
Lee et al.

(10) Patent No.: US 12,252,174 B2
(45) Date of Patent: Mar. 18, 2025

(54) REINFORCED STRUCTURAL MEMBER AND VEHICLE REAR STRUCTURE INCLUDING THE SAME

(71) Applicants: Hyundai Motor Company, Seoul (KR); Kia Corporation, Seoul (KR)

(72) Inventors: Sun Ju Lee, Incheon (KR); Il Do Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 289 days.

(21) Appl. No.: 17/939,236

(22) Filed: Sep. 7, 2022

(65) Prior Publication Data

US 2023/0339542 A1     Oct. 26, 2023

(30) Foreign Application Priority Data

Apr. 21, 2022     (KR) .......................... 10-2022-0049645

(51) Int. Cl.
| | |
|---|---|
| *B62D 21/15* | (2006.01) |
| *B62D 25/08* | (2006.01) |
| *B62D 25/20* | (2006.01) |
| *B62D 27/02* | (2006.01) |

(52) U.S. Cl.
CPC ............. *B62D 21/15* (2013.01); *B62D 25/08* (2013.01); *B62D 25/20* (2013.01); *B62D 27/023* (2013.01)

(58) Field of Classification Search
CPC ........ B62D 21/15; B62D 21/09; B62D 25/08; B62D 27/023; B62D 25/20
See application file for complete search history.

(56) References Cited

U.S. PATENT DOCUMENTS

| | | | | |
|---|---|---|---|---|
| 5,425,561 | A  * | 6/1995 | Morgan  ................. | B60R 19/18 |
| | | | | 293/154 |
| 6,434,907 | B1 * | 8/2002 | Simboli  ................. | B62D 24/02 |
| | | | | 296/205 |
| 6,439,608 | B1 * | 8/2002 | Bonnville  .............. | B62D 24/02 |
| | | | | 180/311 |
| 2002/0008183 | A1 | 1/2002 | Mallard et al. | |
| 2009/0060675 | A1 * | 3/2009 | Yustick  ................ | B62D 25/025 |
| | | | | 411/339 |

(Continued)

FOREIGN PATENT DOCUMENTS

| | | | | |
|---|---|---|---|---|
| CN | 109911027 | A  * | 6/2019 | ............... B60K 1/04 |
| DE | 102004002297 | A1 * | 8/2005 | ............. B62D 25/02 |

(Continued)

OTHER PUBLICATIONS

Cho, Keong Hwan, et al., "Comparative Study of Joint Performance According to Joining Methods Between A17075-T6 and SPFC590DP for Lightweight Car Body", Journal of Welding and Joining, vol. 39, No. 5, 2021, 8 pages.

*Primary Examiner* — Daniel J Colilla
(74) *Attorney, Agent, or Firm* — Banner & Witcoff, Ltd.

(57) ABSTRACT

A reinforced structural member includes a structural member having a hole and having a closed, and/or partially closed, cross-section, and a reinforcement fixed to the structural member. A portion of the reinforcement may be inserted into the structural member through the hole, and the hole and the reinforcement may be configured to align with a mount portion of an associated component when the associated component is mounted on the structural member.

18 Claims, 11 Drawing Sheets

(56) References Cited

U.S. PATENT DOCUMENTS

2017/0267089 A1    9/2017  Sugizaki et al.

FOREIGN PATENT DOCUMENTS

| JP | H 07-179185 A | 7/1995 |
| JP | 2001-150995 A | 6/2001 |
| KR | 20-1998-0038612 U | 9/1998 |
| KR | 10-2017-0067476 A | 6/2017 |
| KR | 10-2020-0043865 A | 4/2020 |

* cited by examiner

REINFORCED STRUCTURAL MEMBER AND VEHICLE REAR STRUCTURE INCLUDING THE SAME

CROSS-REFERENCE TO RELATED APPLICATION

This application claims priority to and the benefit of Korean Patent Application No. 10-2022-0049645 filed in the Korean Intellectual Property Office on Apr. 21, 2022, the entire contents of which are incorporated herein by reference.

TECHNICAL FIELD

The present disclosure relates to a reinforced structural member and a vehicle rear structure comprising the same.

BACKGROUND

Environmental-friendly vehicles, such as electric vehicles and hybrid electric vehicles, may ameliorate environmental problems and/or oil resource depletion. An electric vehicle or a hybrid electric vehicle may be equipped with a battery, which may be mounted on a lower portion of a vehicle body of the electric or hybrid electric vehicle. Because of the weight of the battery adding to the weight of the electric vehicle or the hybrid electric vehicle it may be desirable to reduce the weight of the vehicle, for example, in order to improve an all-electric range (AER) of the electric vehicle or the hybrid electric vehicle. To this end, lightweight materials such as aluminum and carbon fiber reinforced polymers may be used in components of the vehicle body.

SUMMARY

The following summary presents a simplified summary of certain features. The summary is not an extensive overview and is not intended to identify key or critical elements.

Aluminum components may be made in part or entirely of aluminum materials. Aluminum components may be provided with reinforcing structures based on how the aluminum components are manufactured. For example, a cast aluminum component that is to be reinforced in a portion thereof (e.g., to be provided with additional strength and/or support in the portion of the cast aluminum component) may be cast to have an increased thickness in the portion of the cast aluminum to be reinforced, such that the rigidity and/or strength of the portion of the cast aluminum component may be improved. A sheet aluminum component may be reinforced by attaching an additional reinforcing structure, such as a steel component, to a portion of the sheet aluminum component. As a result, the rigidity of the sheet aluminum component may be improved.

An extruded aluminum component may be applied to a vehicle body of a vehicle or the like. The extruded aluminum component may have a substantially uniform cross-section (e.g., a direction perpendicular to a direction of extrusion). The strength of the extruded aluminum component may be less than a strength of a similar component made of steel. The substantially uniform cross-section of the extruded aluminum component may make it difficult to increase a thickness of a only portion of the extruded aluminum component or to attach a reinforcing structure to the extruded aluminum component.

An extruded aluminum component may be used as a cross-member of a vehicle, and a penetration pipe and/or a steel reinforcing structure may be attached to the cross-member to improve a rigidity and/or strength of amounting of a seat base, such as a seat rail and/or a seat leg may be improved. However, in a case in which walls, which define a closed and/or partially closed cross-section of the cross-member, are not parallel to one another, it is difficult to attach a penetration pipe and/or the steel reinforcing structure to the cross-member. A steel reinforcing structure may be formed to be inserted into an extruded component, but to do so may require using more steel, which may increase the weight of the steel reinforcing structure.

Systems, apparatuses, and methods are described for a reinforced structural member and a vehicle rear structure comprising the same. A reinforced structural member may comprise a structural member and a reinforcement fixed to the structural member. The structural member may comprise one or more walls that form a closed cross-section, and one or more of the one or more walls may have a hole formed therein. A portion of the reinforcement may be inserted into the structural member through the hole, and the hole and the reinforcement may be configured be aligned with a mount portion of an associated component when the associated component is mounted on the structural member.

A vehicle rear structure may comprise a rear floor center panel, a first cross-member connected to a front side of the rear floor center panel, a second cross-member positioned forward of the first cross-member and connected to a lower side of the first cross-member, and a third cross-member connected to a rear side of the rear floor center panel. The first cross-member may be configured to accept mounting of a front portion of a seat base of a vehicle seat when the vehicle seat is mounted on the first cross-member and the third cross-member may be configured to accept mounting of a rear portion of the seat base of the vehicle seat when the vehicle seat is mounted on the third cross-member. The first cross-member may have a hole, and a reinforcement may be fixed to the first cross-member through the hole, wherein a portion of the reinforcement may be inserted into the first cross-member through the hole. The hole and the reinforcement may be configured to be aligned with the front portion of the seat base when the vehicle seat is mounted on the first cross-member.

In the reinforced structural member, a portion of a reinforcement may be inserted into a structural member through a hole, and the hole and the reinforcement may be aligned with an associated component, which may make it possible to securely support the associated component mounted on the structural member and improve mounting rigidity of the associated component.

These and other features and advantages are described in greater detail below.

DETAILED DESCRIPTION

Figure 1:
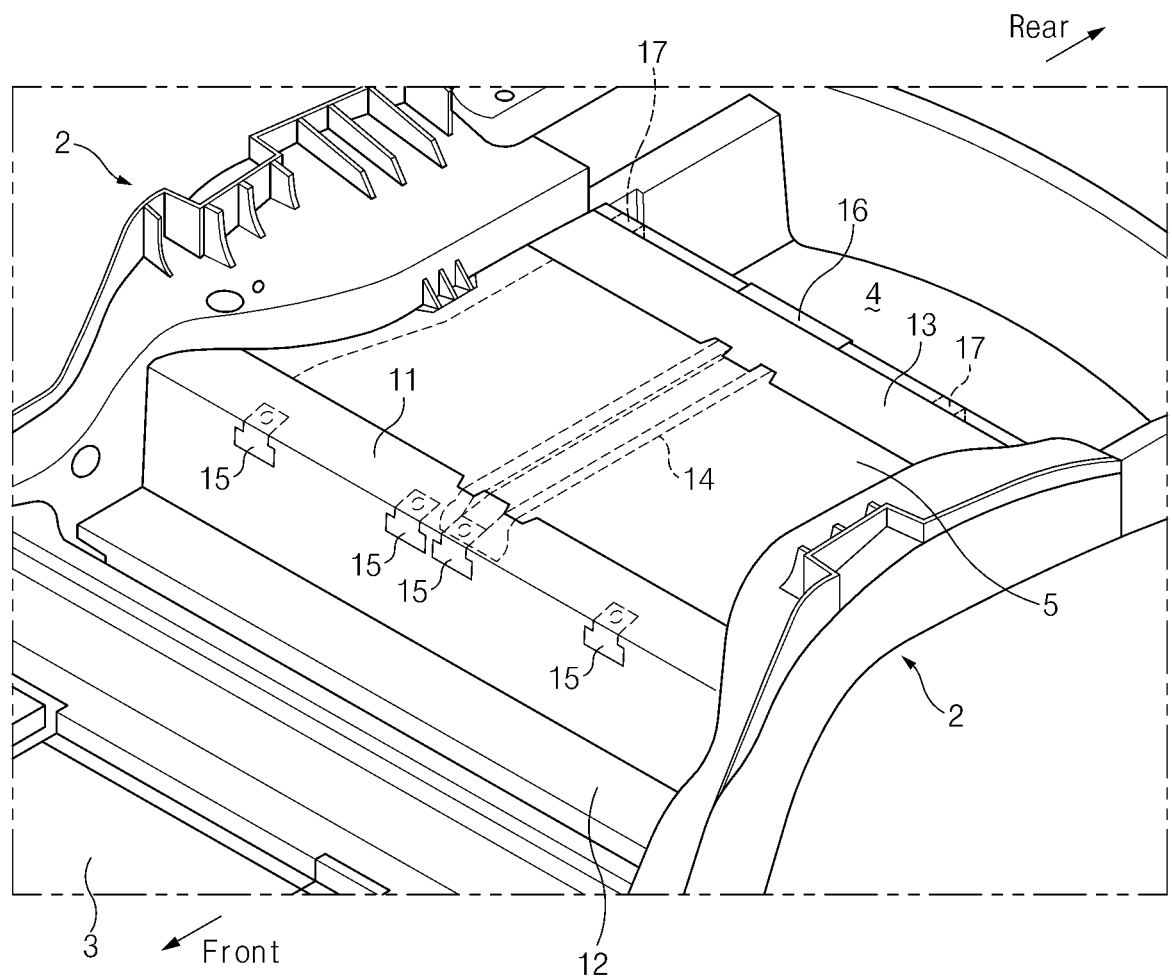
FIG. 1 is a perspective view illustrating a vehicle rear structure according to an example of the present disclosure.

The accompanying drawings, which form a part hereof, show examples of the disclosure. It is to be understood that the examples shown in the drawings and/or discussed herein are non-exclusive and that there are other examples of how the disclosure may be practiced.

Hereinafter, examples of the present disclosure will be described in detail with reference to the illustrative drawings. In giving reference numerals to constituent elements of the respective drawings, it should be noted that the same constituent elements may be designated by the same reference numerals, if possible, even though the constituent elements are illustrated in different drawings.

In addition, the terms first, second, A, B, (a), and (b) may be used to describe constituent elements of the present disclosure. These terms are used only for the purpose of distinguishing one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present disclosure pertains.

Referring to FIG. 1, a vehicle rear structure 10, according to an example of the present disclosure, may comprise a rear floor center panel 5, a rear floor front panel 3 positioned forward (e.g., in a direction that would be towards a front of a vehicle comprising the vehicle rear structure 10) of the rear floor center panel 5, and a spare tire well 4 positioned rearward (e.g., in a direction that would be towards a rear of a vehicle comprising the vehicle rear structure 10) of the rear floor center panel 5.

Figure 2:
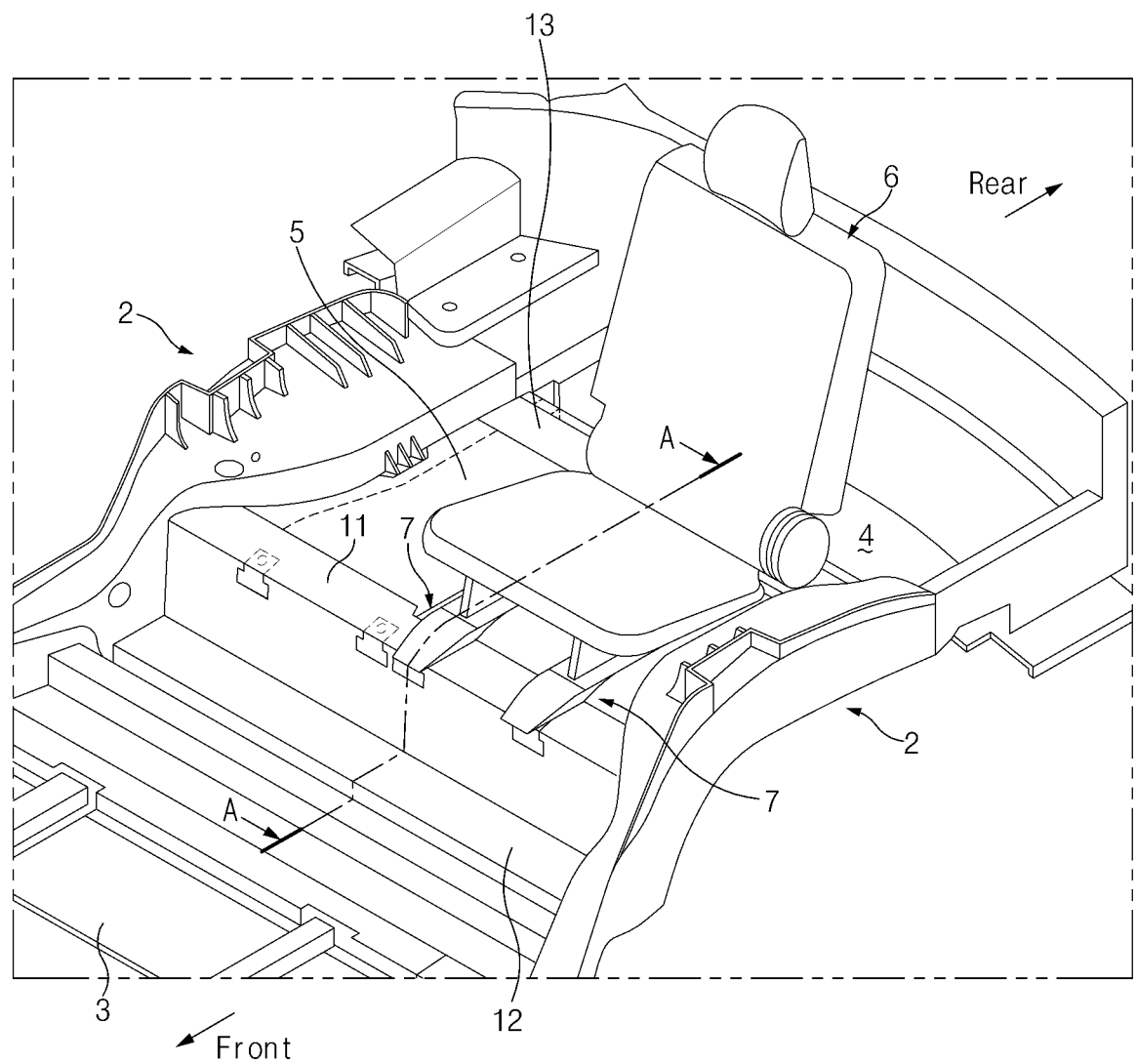
FIG. 2 is a view illustrating a vehicle seat mounted on the vehicle rear structure according to the example of the present disclosure.
Figure 3:
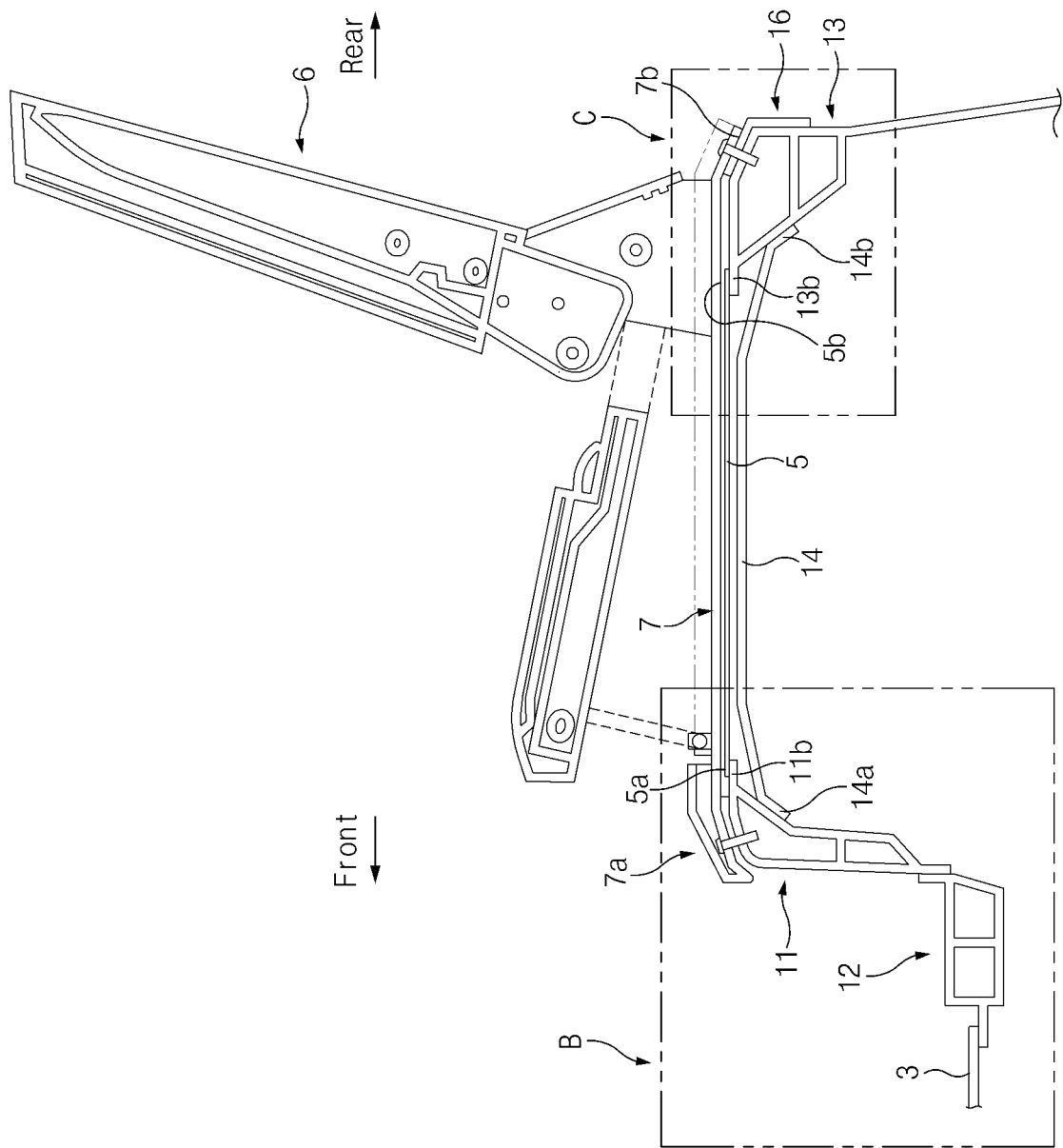
FIG. 3 is a cross-sectional view taken along line A-A in FIG. 2.

Referring to FIGS. 1 and 2, a pair of rear side members 2 may be disposed at two opposing sides of the rear floor center panel 5, and the rear side members 2 may each extend in a substantially longitudinal direction (e.g., in a direction substantially parallel to a front-to-rear axis, as shown in FIGS. 1-3, and/or in a direction substantially parallel to what would be a front-to-rear axis of a vehicle comprising the vehicle rear structure 10).

Referring to FIG. 3, the rear floor center panel 5 may comprise a front edge 5a and a rear edge 5b. A first cross-member 11 may be positioned forward of the rear floor center panel 5. The first cross-member 11 may be connected to the front edge 5a of the rear floor center panel 5. The first cross-member 11 may extend in a cross direction, wherein the cross direction may be a direction substantially perpendicular to the longitudinal direction (e.g., in a direction that would be a width direction of a vehicle comprising the vehicle rear structure 10). A second cross-member 12 may be positioned forward of the first cross-member 11. The second cross-member 12 may be connected to a lower portion of the first cross-member 11. The second cross-member 12 may extend substantially in the cross direction. A third cross-member 13 may be positioned rearward of the rear floor center panel 5. The third cross-member 13 may be connected to the rear edge 5b of the rear floor center panel 5. The third cross-member 13 may extend substantially in the cross direction.

The first cross-member 11 may have a closed, and/or partially closed, longitudinal cross-section, which may extend in the cross direction. The first cross-member 11 may have an internal space (interior volume or interior cavity) defined by the closed, and/or partially closed, cross-section.

Figure 4:
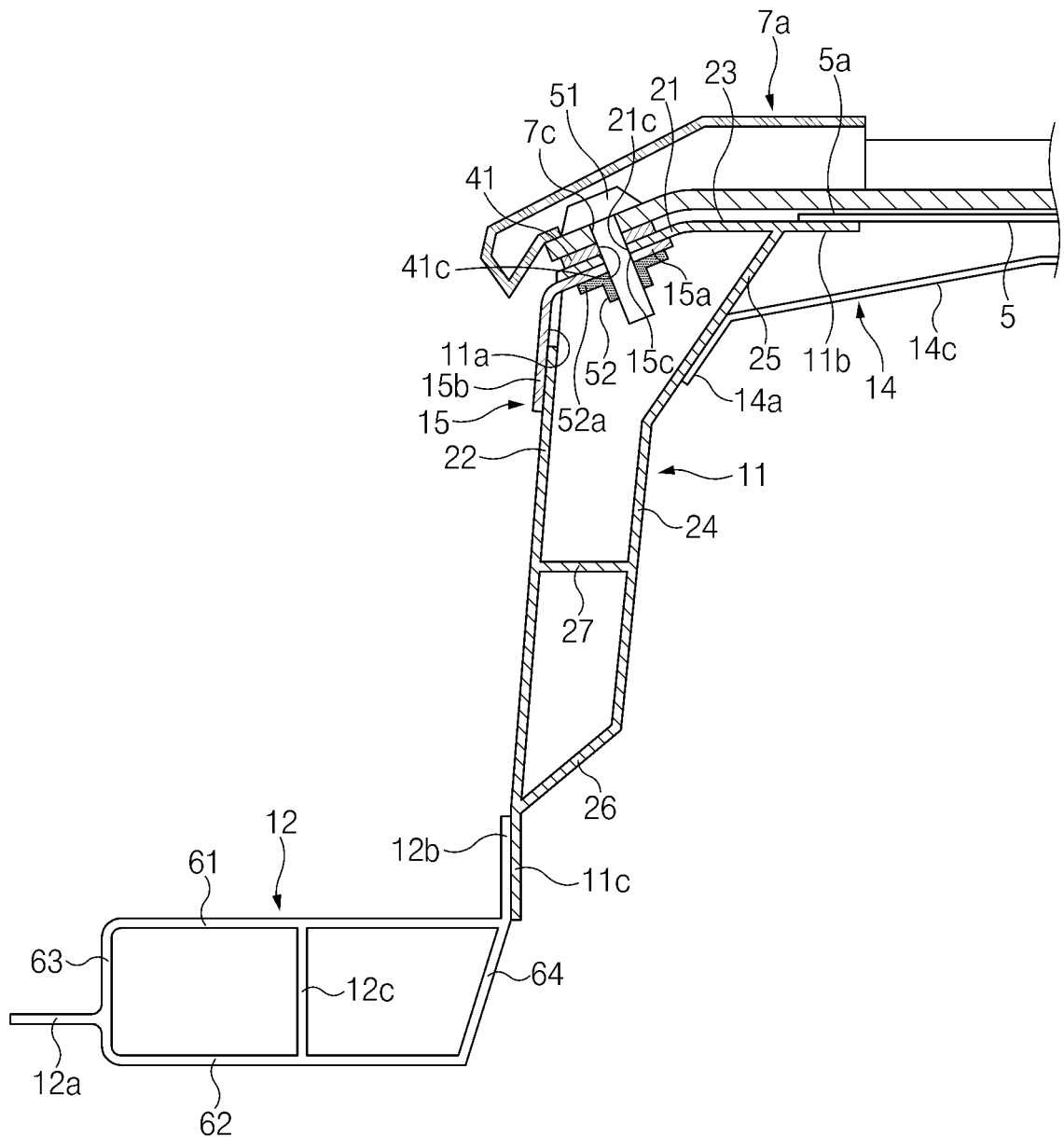
FIG. 4 is an enlarged view of portion B in FIG. 3.

Referring to FIG. 4, the first cross-member 11 may comprise a first wall 21, and a second wall 22 connected to the first wall 21 such that a longitudinal cross-section of the first wall 21 and the second wall 22 forms a first angle in the longitudinal direction. The second wall 22 may form a corner with the first wall 21. The first angle may be, for example, between 90° and 180°.

The first wall 21 may be inclined (e.g., may be non-parallel) in the longitudinal direction at a second angle with respect to the rear floor center panel 5. The second wall 22 may extend from a front portion of the first wall 21 toward a substantially downward direction (e.g., in a direction that would point to a lower side of a vehicle comprising the vehicle rear structure 10). In an example, a longitudinal cross-section of the second wall 22 may be substantially perpendicular to that of the rear floor center panel 5. The second wall 22 may have a flat surface substantially orthogonal to the longitudinal direction. The second wall 22 may be positioned toward the front of the vehicle rear structure 10.

The first cross-member 11 may comprise: a third wall 23 extending from the first wall 21 toward the rear of the vehicle rear structure 10; a fourth wall 24 spaced apart from the second wall 22 and positioned toward the rear of the vehicle rear structure 10 relative to the second wall 22; a wall 25 connected at a lower edge to an upper edge of the fourth wall 24 and connected at an upper edge to the third wall 23; and a bottom wall 26 connected at a lower edge to the second wall 22 and connected at an upper edge to a lower edge of the fourth wall 24. The first wall 21 may be inclined with respect to the third wall 23. The second wall 22 may be substantially parallel to the fourth wall 24. The bottom wall 26 may extend upwardly diagonally from a lower edge of the second wall 22 to the lower edge of the fourth wall 24. In addition, the first cross-member 11 may further comprise a reinforcing rib 27 provided in the first cross-member 11. The reinforcing rib 27 may be configured to connect the second wall 22 and the fourth wall 24. The reinforcing rib 27 may extend substantially in the longitudinal and cross directions. The rigidity of the first cross-member 11 may be improved by the reinforcing rib 27.

The first cross-member 11 may have a rear flange 11b and a lower flange 11c. The rear flange 11b may extend from a substantially rear edge of the first cross-member 11 toward the rear of the vehicle rear structure 10. In an example, the rear flange 11b may extend from a connection between the third wall 23 and the wall 25 in the longitudinal direction toward the rear of the vehicle rear structure 10. Referring to FIGS. 3 and 4, the rear flange 11b of the first cross-member 11 may be fixed to the front edge 5a of the rear floor center panel 5. The rear flange 11b may be fixed to the front edge 5a of the rear floor center panel 5 (e.g., by fastening, which may allow for fix to be adjustable, welding or bonding, which may allow for the fix to be more stable, etc.).

The lower flange 11c may extend from the lower edge of the first cross-member 11 in a substantially downward direction. For example, the lower flange 11c may extend from the lower edge of the second wall 22 toward what would be a lower side of a vehicle comprising the vehicle rear structure 10.

The second cross-member 12 may have a closed, or partially closed, longitudinal cross-section, which may extend in the cross direction. The second cross-member 12 may have an internal space (interior volume or interior cavity) defined by the closed, and/or partially closed, longitudinal cross-section.

Referring to FIG. 4, the second cross-member 12 may comprise: an upper wall 61 positioned substantially toward an upper side of the vehicle rear structure 10; a bottom wall 62 positioned substantially toward the lower side of the vehicle rear structure 10; a front wall 63 positioned substantially toward the front side of the vehicle rear structure 10; and a rear wall 64 positioned substantially toward the rear side of the vehicle rear structure 10. The rear wall 64 may be inclined relative to the front wall 63, and/or may extending from a rear edge of the bottom wall 62 toward a rear edge of the upper wall 61.

The second cross-member 12 may be connected to a lower portion of the first cross-member 11. The second cross-member 12 may comprise a front flange 12a provided at a front side of the front wall 63, and a rear flange 12b provided toward a rear side of the second cross-member 12.

The front flange 12a may extend substantially in the longitudinal and cross directions. The front flange 12a may extend in the longitudinal direction from the front wall 63 toward the front of the vehicle rear structure 10. The front flange 12a may be fixed to a rear edge of the rear floor front panel 3 (e.g., by fastening, welding, bonding, etc.).

The rear flange 12b may extend in the from the rear side of the second cross-member 12 toward an upper side of the vehicle rear structure 10. Specifically, the rear flange 12b may extend from a rear connection between the upper wall 61 and the rear wall 64, and in a direction substantially away from the lower wall 62. The rear flange 12b may be fixed to the lower flange 11c of the first cross-member 11 (e.g., by fastening, welding, bonding, etc.).

The second cross-member 12 may further comprise a reinforcing rib 12c. The reinforcing rib 12c may be connected to the upper wall 61 and to the bottom wall 62. The reinforcing rib 12c may be positioned away from each of the front wall 63 and the rear wall 64. T reinforcing rib 12c may extend in directions substantially perpendicular to the longitudinal direction. The reinforcing rib 12c may extend substantially in the cross direction. Therefore, the reinforcing rib 12c may improve the longitudinal bending rigidity of the second cross-member 12.

Figure 5:
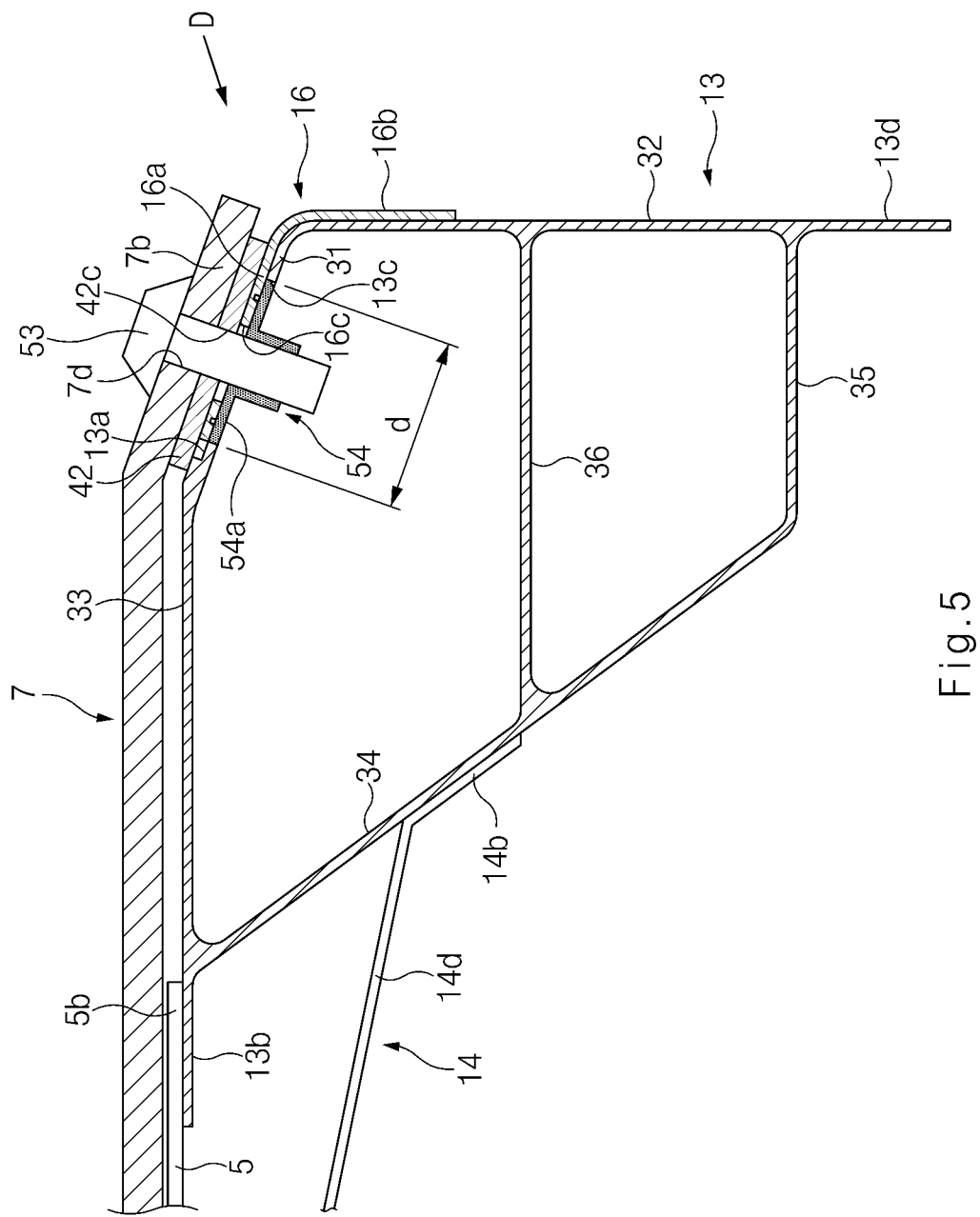
FIG. 5 is an enlarged view of portion C in FIG. 3.

Referring to FIG. 5, The third cross-member 13 may have a closed, and/or partially closed, cross-section extending in a longitudinal direction thereof. The third cross-member 13 may have an internal space (interior volume or interior cavity) defined by the closed, and/or partially closed, cross-section.

The third cross-member 13 may be fixed to the rear edge 5b of the rear floor center panel 5 (e.g., by fastening, welding, bonding, etc.).

The third cross-member 13 may comprise a first wall 31, and a second wall 32 connected to the first wall 31 such that a longitudinal cross-section of the first wall 31 and the second wall 32 forms a third angle. The third angle may be, for example, between 90° and 180°.

The first wall 31 may be inclined at a fourth angle with respect to the rear floor center panel 5. The second wall 32 may extend from a front side of the first wall 31 in a substantially downward direction (e.g., in a direction that would point toward the lower side of a vehicle comprising the vehicle rear structure 10. In an example, a longitudinal cross-section of the second wall 32 may be substantially perpendicular to that of the rear floor center panel 5. The second wall 32 may comprise a flat surface substantially orthogonal to the longitudinal direction. The second wall 32 may be positioned toward the rear of the vehicle rear structure 10.

The third cross-member 13 may comprise: a third wall 33 extending from the first wall 31 toward the front of the vehicle rear structure 10; a fourth wall 34 spaced apart from the second wall 32 and positioned toward the front of the vehicle rear structure 10; and a bottom wall 35 configured to connect to a lower end of the second wall 32 and to a lower end of the fourth wall 34. A longitudinal cross-section of the first wall 31 may be inclined with respect to the third wall 33. A lower edge of the fourth wall 34 may connect to a front edge of the bottom wall 35 and an upper edge of the fourth wall 34 may connect to a front edge of the third wall 33. The third cross-member 13 may further comprise a reinforcing rib 36. The reinforcing rib 36 may connect to the second wall 32 and to the fourth wall 34, and may be spaced apart from the third wall 33 and the bottom wall 35. The reinforcing rib 36 may extend substantially in the longitudinal and cross directions. The rigidity of the third cross-member 13 may be improved by the reinforcing rib 36.

The third cross-member 13 may further comprise a front flange 13b, and a lower flange 13d.

The front flange 13b may extend from a front portion of the third cross-member 13 toward the front of the vehicle rear structure 10. For example, the front flange 13b may extend in the longitudinal direction from a front edge of the third wall 33 toward the front of the vehicle rear structure 10. The front flange 13b may be fixed to the rear edge 5b of the rear floor center panel 5 (e.g., by fastening, welding, bonding, etc.).

The lower flange 13d may extend from a lower side of the third cross-member 13 in a substantially downward direction. Specifically, the lower flange 13d may extend in the from a lower edge of the second wall 32 toward the lower side of the vehicle rear structure 10.

The first cross-member 11, the second cross-member 12, and the third cross-member 13 may each be a structural member extending substantially in the cross direction. Referring to FIG. 3, the first cross-member 11, the second cross-member 12, and the third cross-member 13 may each be an extruded component having a closed, and/or partially closed, cross-section extending in the cross direction.

Figure 6:
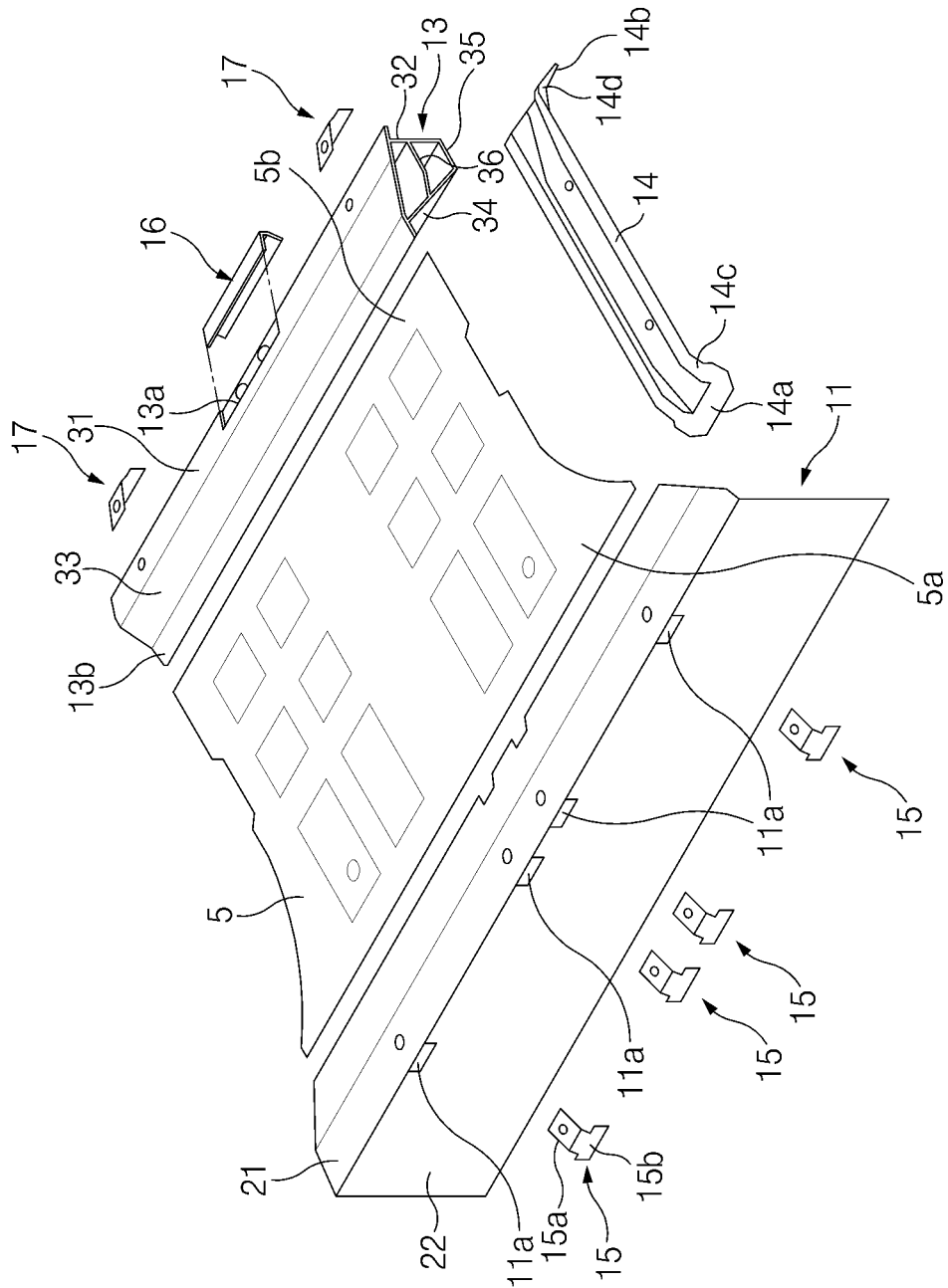
FIG. 6 is an exploded perspective view of a rear floor center panel, a first cross-member, a third cross-member, and a support member of the vehicle rear structure according to the present disclosure are disassembled.
Figure 7:
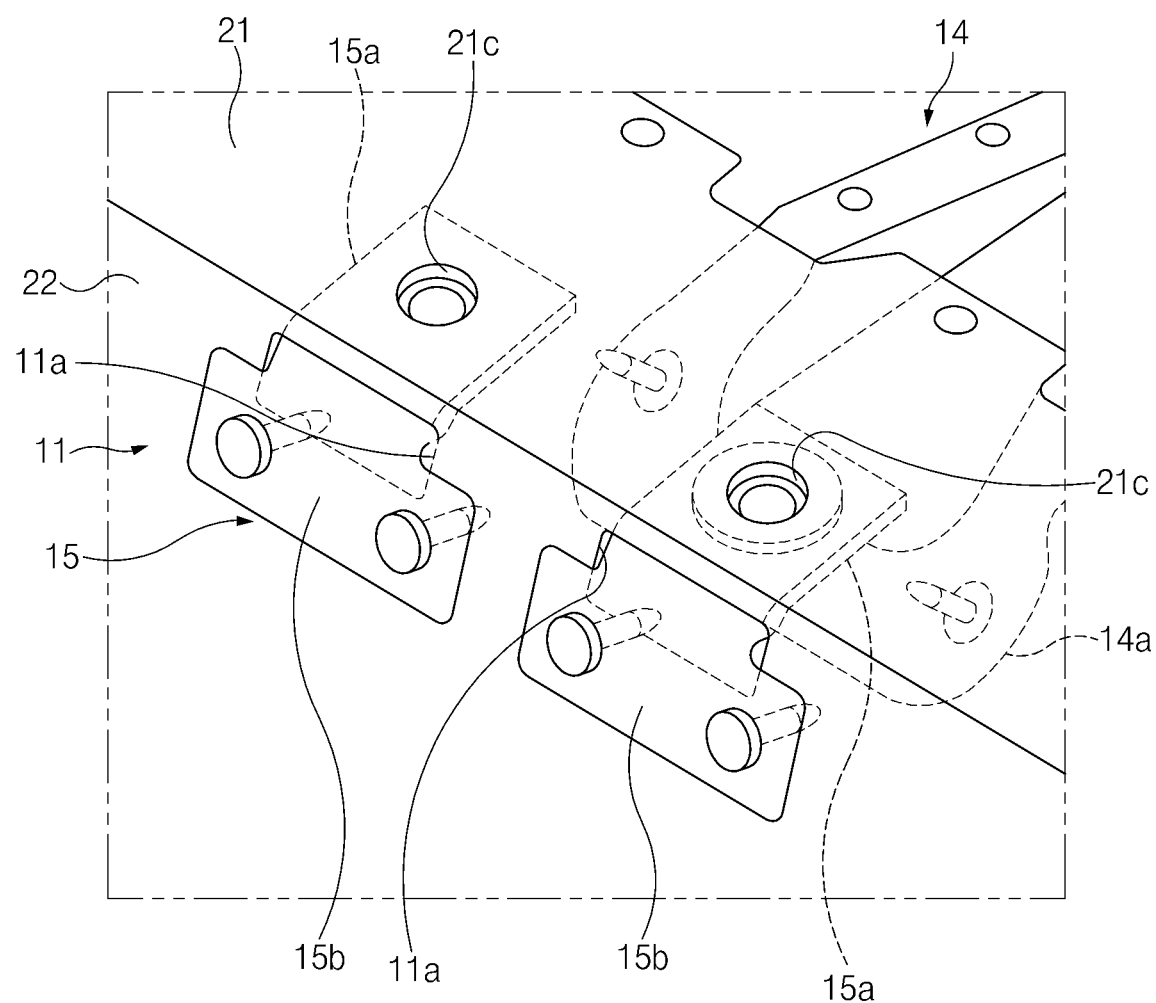
FIG. 7 is a perspective view which a reinforcement mounted on the first cross-member in the vehicle rear structure according to the present disclosure.

Referring to FIGS. 4, 6, and 7, the first cross-member 11 may have one or more holes, such as hole 11a. For example, a plurality of holes 11a may be provided in a front portion of the first cross-member 11. A plurality of reinforcing structures (e.g., reinforcements) 15 may be independently mounted on the first cross-member 11 by insertion through the plurality of holes 11a. The hole 11a may have a shape configured to accept a reinforcing structure 15 (e.g., a slot shape corresponding to a cross-section shape of a first fixing portion 15a of the reinforcing structure 15). As described above, the reinforcing structure 15 may be fixed to the first cross-member 11 through the hole 11a. Therefore, a reinforced structural member may comprise the reinforcing structure 15 and the first cross-member 11.

The hole 11a may be adjacent to (e.g., near and/or in contact with) a connection between the first wall 21 and the second wall 22. Referring to FIGS. 4, 6, and 7, the hole 11a may be in an upper portion of the second wall 22, and may be disposed adjacent to the connection between the first wall 21 and the second wall 22. The reinforcing structure 15 may comprise a first fixing portion 15a and a second fixing portion 15b. The second fixing portion 15b may be connected to the first fixing portion 15a at a fifth angle. The first fixing portion 15a may be inserted into the first cross-member 11 through the hole 11a. The first fixing portion 15a may be fixed to the first wall 21 of the first cross-member 11. Fixing the reinforcing portion 15 to the first wall 21 may improve the rigidity of the first wall 21 of the first cross-member 11.

Referring to FIG. 4, an associated component (e.g., seat base 7, such as a seat rail or seat leg, of a vehicle seat 6), together with the first fixing portion 15a of the reinforcing structure 15, may be mounted on the first wall 21 of the first cross-member 11. A mounting hardware component 52 for mounting the associated component may be fixed to the first fixing portion 15a of the reinforcing structure 15 (e.g., by fastening, welding bonding, etc.). For example, the mounting hardware component 52 may be a mounting nut having a head portion 52a. The head portion 52a of the mounting hardware component 52 may be fixed to the first fixing portion 15a (e.g., by welding).

A front portion 7a of the seat base 7 of the vehicle seat 6, together with the first fixing portion 15a, may be mounted on the first wall 21 of the first cross-member 11. A mounting spacer 41 may be interposed between the front portion 7a of the seat base 7 and the first wall 21 of the first cross-member 11. The front portion 7a of the seat base 7 may be securely connected to the first wall 21 of the first cross-member 11 by means of the mounting spacer 41. The first fixing portion 15a may have a through-hole 15c, which may be aligned with a mounting hole of the mounting hardware component 52. The first wall 21 of the first cross-member 11 may have a through-hole 21c, which may be positioned relative to the hole 11a so as to be aligned with the through-hole 15c of the first fixing portion 15a when the first fixing portion 15a is inserted in the hole 11a. The mounting spacer 41 may have a through-hole 41c, which may be aligned with the through-hole 21c of the first wall 21. The front portion 7a of the seat base 7 may have a through-hole 7c aligned with the through-hole 41c of the mounting spacer 41. The front portion 7a of the seat base 7, together with the mounting spacer 41 and the first fixing portion 15a, may be fixed to the first wall 21 of the first cross-member 11 when a mounting bolt 51 penetrates the through-hole 7c of the front portion 7a of the seat base 7, the through-hole 41c of the mounting spacer 41, the through-hole 21c of the first wall 21, and the through-hole 15c of the first fixing portion 15a and is screw-coupled to the mounting hole of the mounting hardware component 52. As described above, the first wall 21 of the first cross-member 11 and the first fixing portion 15a of the reinforcing structure 15, which corresponds to the first wall 21 of the first cross-member 11, may constitute a mount portion for mounting the front portion 7a of the seat base 7 that is the mount portion of the associated component.

The second fixing portion 15b may be fixed to the second wall 22 of the first cross-member 11 by fastening, welding, bonding, etc. In particular, the second fixing portion 15b may be fixed to the second wall 22 of the first cross-member 11 by means of flow drilled screws (FDSs), which makes it possible to improve bonding strength and bonding quality of the second fixing portion 15b.

As described above, the first fixing portion 15a, together with the front portion 7a of the seat base 7, may be fixed to the first wall 21 of the first cross-member 11 by means of the mounting bolt 51 and the mounting hardware component 52, and only the second fixing portion 15b may be fixed to the first cross-member 11 by means of the FDSs. Therefore, it is possible to reduce the number of FDSs, thereby reducing the weight and costs.

Referring to FIG. 7, the hole 11a and the reinforcing structure 15 may be aligned with the front portion 7a of the seat base 7 that is the mount portion of the associated component mounted on the first cross-member 11. As described above, the first fixing portion 15a of the reinforcing structure 15 may be inserted into the first cross-member 11 through the hole 11a, and the hole 11a and the reinforcing structure 15 may be aligned with the front portion 7a of the seat base 7. Therefore, it is possible to securely support the front portion 7a of the seat base 7 mounted on the first cross-member 11 and improve the mounting rigidity of the front portion 7a of the seat base 7. Further, the reinforcing structure 15 may be mounted on the first cross-member 11 through the hole 11a, such that the rigidity of only a portion of the first cross-member 11 (a portion of the first cross-member 11 on which the front portion 7a of the seat base 7 may be configured to be mounted) may be improved, which may allow for reducing a size of the reinforcing structure 15, a number of reinforcing structures 15, and a weight required for the reinforcing structure. Therefore, it may be possible to simplify the structure for reinforcing the first cross-member 11, reduce a weight of the first cross-member 11, and simplify the assembly process. In particular, the hole 11a may be aligned with the front portion 7a of the seat base 7 (e.g., a mount portion of the associated component), and the reinforcing structure 15 may be aligned with the front portion 7a of the seat base 7 when inserted through the hole 11a. This alignment may make it possible to reduce the number of holes 11a and the size of the hole 11a, and prevent or minimize initiation of cracks from the hole 11a. Further, the reinforcing structure 15 inserted into the hole 11a may improve the rigidity of the first cross-member 11.

Referring to FIG. 4, the first fixing portion 15a may be fixed to the bottom surface of the first wall 21, and the second fixing portion 15b may be fixed to an outer surface of the second wall 22, such that the reinforcing structure 15 may be securely mounted on the first cross-member 11. An angle between the first fixing portion 15a and the second fixing portion 15b may be equal to an angle between the first wall 21 and the second wall 22. Therefore, the first fixing portion 15a of the reinforcing structure 15 may be in tight contact with the first wall 21 of the first cross-member 11, such that the first fixing portion 15a may be securely fixed to the first wall 21. The second fixing portion 15b of the reinforcing structure 15 may be in tight contact with the second wall 22 of the first cross-member 11, such that the second fixing portion 15b may be securely fixed to the second wall 22.

For example, the reinforcing structure 15 may be made of a high-strength steel material such as SGAFC590. A thickness of the reinforcing structure 15 may be approximately 1.6 mm.

Figure 8:
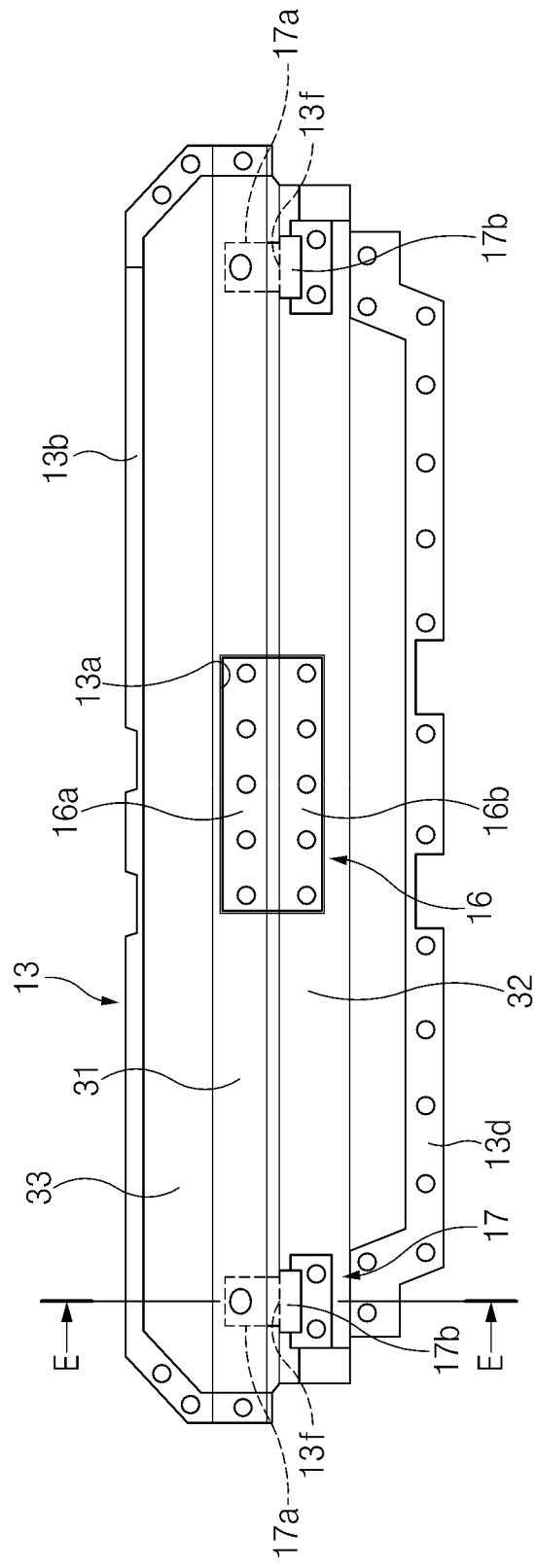
FIG. 8 is a view of the third cross-member viewed from a direction indicated by arrow D in FIG. 5.

Referring to FIGS. 5, 6, and 8, the third cross-member 13 may have a groove 13a formed in a central portion thereof. The groove 13a may be formed at a position adjacent to a corner between the first wall 31 and the second wall 32. The groove 13a may be recessed downward from the first wall 31. The groove 13a may be formed in the first wall 31 of the third cross-member 13 that is adjacent to the corner between the first wall 31 and the second wall 32. A center reinforcing structure 16 may be mounted on the third cross-member 13 through the groove 13a. The center reinforcing structure 16 may comprise a first fixing portion 16a and a second fixing portion 16b. The second fixing portion 16b may be connected to the first fixing portion 16a at a predetermined angle. The first fixing portion 16a may be accommodated in and fixed into the groove 13a of the third cross-member 13. The second fixing portion 16b may be fixed to the second wall 32 of the third cross-member 13 (e.g., by fastening, welding, bonding, etc.). For example, the first fixing portion 16a and the second fixing portion 16b of the center reinforcing structure 16 may be fixed to the third cross-member 13 through flow drilled screws (FDSs).

Referring to FIG. 5, the associated component such as the seat rail or seat base 7 of the vehicle seat 6, together with the first fixing portion 16a of the center reinforcing structure 16, may be mounted on the first wall 31 of the third cross-member 13. A mounting hardware component 54 for mounting the associated component may be fixed to the first fixing portion 16a of the center reinforcing structure 16 (e.g., by welding bonding, etc.). For example, the mounting hardware component 54 may be a mounting nut having a head portion 54a. The head portion 54a of the mounting hardware component 54 may be fixed to the first fixing portion 16a by welding.

Specifically, a rear portion 7b of the seat base 7 of the vehicle seat 6, together with the first fixing portion 16a, may be mounted on the first wall 31 of the third cross-member 13. A mounting spacer 42 may be interposed between the rear portion 7b of the seat base 7 and the first wall 31 of the third cross-member 13. The rear portion 7b of the seat base 7 may be connected to the first wall 31 of the third cross-member 13 by means of a mounting hardware component 54. The first wall 31 may have a through-hole 13c formed below the groove 13a. A diameter d of the through-hole 13c may be equal to or slightly larger than that of the head portion 54a of the mounting hardware component 54. The head portion 54a of the mounting hardware component 54 may be accommodated in the through-hole 13c of the first wall 31. The head portion 54a of the mounting hardware component 54 may be fixed directly to the first fixing portion 16a by means of flow drilled screws (FDSs). Therefore, the mounting hardware component 54 may be securely fixed to the first fixing portion 16a of the center reinforcing structure 16. The rear portion 7b of the seat base 7 may be securely mounted on the first fixing portion 16a of the center reinforcing structure 16 by means of the mounting hardware component 54.

The first fixing portion 16a may have a through-hole 16c aligned with a mounting hole of the mounting hardware component 54. The mounting spacer 42 may have a through-hole 42c aligned with the through-hole 16c of the first fixing portion 16a. The rear portion 7b of the seat base 7 may have a through-hole 7d aligned with the through-hole 42c of the mounting spacer 42. The rear portion 7b of the seat base 7, together with the mounting spacer 42 and the first fixing portion 16a, may be fixed to the first wall 31 of the third cross-member 13 when a mounting bolt 53 penetrates the through-hole 7d of the rear portion 7b of the seat base 7, the through-hole 42c of the mounting spacer 42, and the through-hole 16c of the first fixing portion 16a and is screw-coupled to the mounting hole of the mounting hardware component 52. As described above, the first wall 31 of the third cross-member 13 and the first fixing portion 16a of the center reinforcing structure 16, which corresponds to the first wall 31 of the third cross-member 13, may constitute a mount portion for mounting the rear portion 7b of the seat base 7 that is the mount portion of the associated component.

The second fixing portion 16b may be fixed to the second wall 32 of the third cross-member 13 (e.g., by fastening, welding, bonding, etc.). In particular, the second fixing portion 16b may be fixed to the second wall 32 of the third cross-member 13, which makes it possible to improve bonding strength and bonding quality of the second fixing portion 16b.

Referring to FIGS. 6 and 8, the groove 13a and the center reinforcing structure 16 may be aligned with the rear portion 7b of the seat base 7 that is the mount portion of the associated component mounted on the third cross-member 13. As described above, the first fixing portion 16a of the center reinforcing structure 16 may be fixed to the third cross-member 13 through the groove 13a, and the groove 13a and the center reinforcing structure 16 may be aligned with the rear portion 7b of the seat base 7. Therefore, it is possible to securely support the rear portion 7b of the seat base 7 mounted on the third cross-member 13 and improve the mounting rigidity of the rear portion 7b of the seat base 7. Further, since the center reinforcing structure 16 is mounted on the third cross-member 13 through the groove 13a, it is possible to improve the rigidity of the central portion of the third cross-member 13, simplify the structure for reinforcing the third cross-member 13, reduce the weight of the third cross-member 13, and simplify the assembly process. In particular, since the groove 13a is formed only at the position aligned with the rear portion 7b of the seat base 7 (e.g., the mount portion of the associated component), it is possible to significantly reduce a size of the groove 13a and prevent or minimize initiation of cracks from the groove 13a. Further, since the first fixing portion 16a of the center reinforcing structure 16 is accommodated in the groove 13a, the rigidity of the third cross-member 13 may be improved.

Referring to FIG. 5, the first fixing portion 16a may be fixed to the groove 13a of the first wall 31, and the second fixing portion 16b may be fixed to an outer surface of the second wall 32, such that the center reinforcing structure 16 may be securely mounted on the third cross-member 13. An angle between the first fixing portion 16a and the second fixing portion 16b may be equal to an angle between the first wall 31 and the second wall 32. Therefore, the first fixing portion 16a of the center reinforcing structure 16 may be in tight contact with the groove 13a of the first wall 31, such that the first fixing portion 16a may be securely fixed to the first wall 31. The second fixing portion 16b of the center reinforcing structure 16 may be in tight contact with the second wall 32 of the third cross-member 13, such that the second fixing portion 16b may be securely fixed to the second wall 32.

For example, the center reinforcing structure 16 may be made of a high-strength steel material such as SGAFC590. A thickness of the center reinforcing structure 16 may be approximately 2.0 mm.

Figure 9:
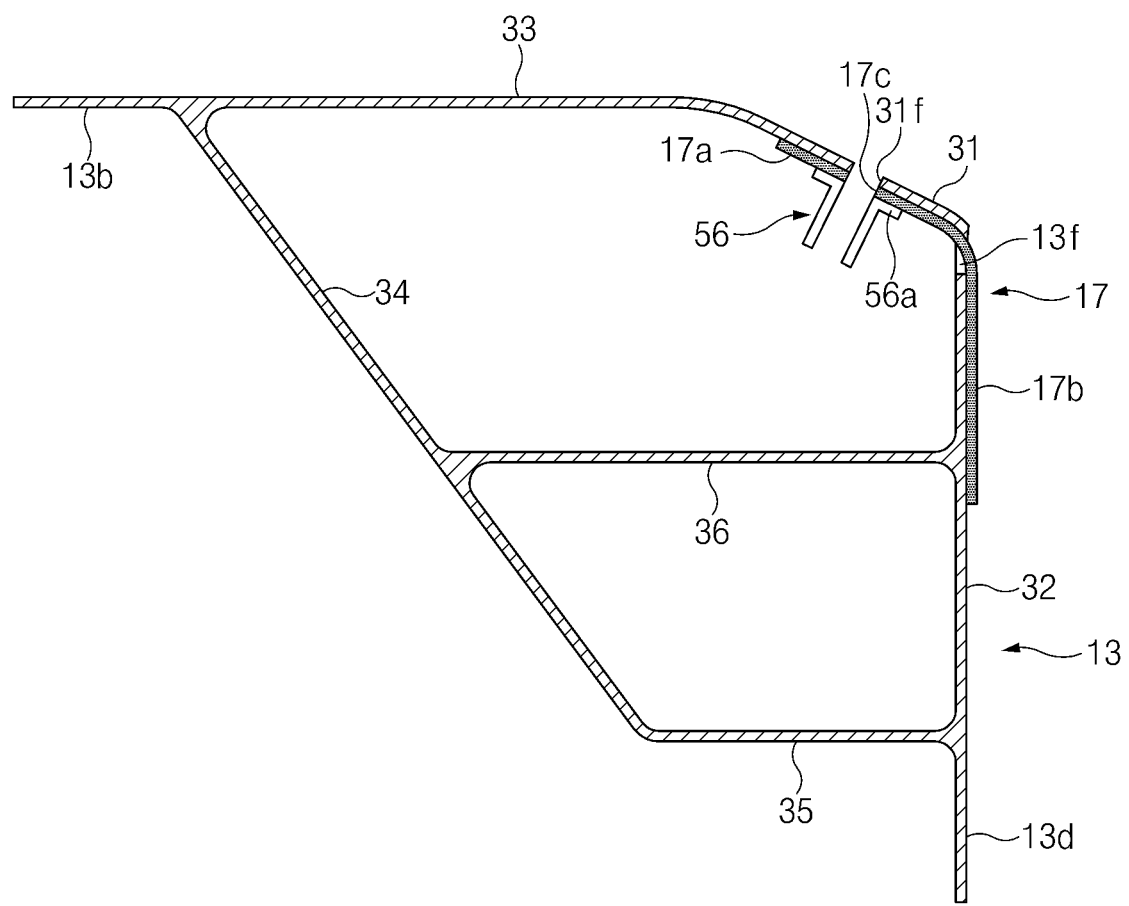
FIG. 9 is a cross-sectional view taken along line E-E in FIG. 8.

Referring to FIGS. 8 and 9, the third cross-member 13 may have two side holes 13f symmetrically disposed at two opposite left and right sides based on the groove 13a. The side hole 13f may each have a slot or rectangular shape.

Referring to FIG. 8, the side holes 13f may be formed at positions adjacent to a corner between the first wall 31 and the second wall 32. Specifically, the side holes 13f may be formed in the second wall 32 of the third cross-member 13 that is adjacent to the corner between the first wall 31 and the second wall 32. Two side reinforcing structures 17 may be independently mounted on the third cross-member 13 through the two side holes 13f.

Referring to FIG. 9, the side reinforcing structures 17 may each comprise a first fixing portion 17a and a second fixing portion 17b. The second fixing portion 17b may be connected to the first fixing portion 17a at a predetermined angle. The first fixing portion 17a may be inserted into the third cross-member 13 through the side hole 13f. The first fixing portion 17a may be fixed to the first wall 31 of the third cross-member 13. The associated component such as the seat rail or seat base 7 of the vehicle seat 6, together with the first fixing portion 17a of the side reinforcing structure 17, may be mounted on the first wall 31 of the third cross-member 13. A mounting hardware component 56 for mounting the associated component may be fixed to the first fixing portion 17a of the side reinforcing structure 17 (e.g., by welding bonding, etc.). For example, the mounting hardware component 56 may be a mounting nut having a head portion 56a. The head portion 56a of the mounting hardware component 56 may be fixed to the first fixing portion 17a by welding.

The second fixing portion 17b may be fixed to the second wall 32 of the third cross-member 13 (e.g., by fastening, welding, bonding, etc.). In particular, the second fixing portion 17b may be fixed to the second wall 32 of the third cross-member 13 by means of flow drilled screws (FDSs), which makes it possible to improve bonding strength and bonding quality of the second fixing portion 17b.

Similar to the center reinforcing structure 16, the first fixing portion 17a of the side reinforcing structure 17, together with the rear portion 7b of the seat base 7, may be fixed to the first wall 31 of the third cross-member 13 by means of a mounting bolt (not illustrated) and the mounting hardware component 56, and only the second fixing portion 17b may be fixed to the third cross-member 13 by means of the FDSs. Therefore, it is possible to reduce the number of FDSs, thereby reducing the weight and costs.

For example, the side reinforcing structure 17 may be made of a high-strength steel material such as SGAFC590. A thickness of the side reinforcing structure 17 may be approximately 1.6 mm.

Referring to FIG. 1, a support member 14 may be disposed below the rear floor center panel 5. The support member 14 may extend along a longitudinal central axis of the rear floor center panel 5.

Referring to FIG. 3, the support member 14 may be configured to connect the first cross-member 11 and the third cross-member 13. The support member 14 may comprise a front flange 14a provided at a front portion thereof, and a rear flange 14b provided at a rear portion thereof.

Referring to FIGS. 3 and 4, the front flange 14a may be fixed to the first cross-member 11 (e.g., by fastening, welding, bonding, etc.). The support member 14 may have a front inclined portion 14c connected to the front flange 14a.

Referring to FIGS. 3 and 5, the rear flange 14b may be fixed to the third cross-member 13 (e.g., by fastening, welding, bonding, etc.). The support member 14 may have a rear inclined portion 14d connected to the rear flange 14b.

As described above, the support member 14 may be disposed below the rear floor center panel 5 and connect the first cross-member 11 and the third cross-member 13. Therefore, the support member 14 may improve the structural rigidity and strength of the vehicle rear structure and reduce vibration of the rear floor center panel 5.

Figure 10:
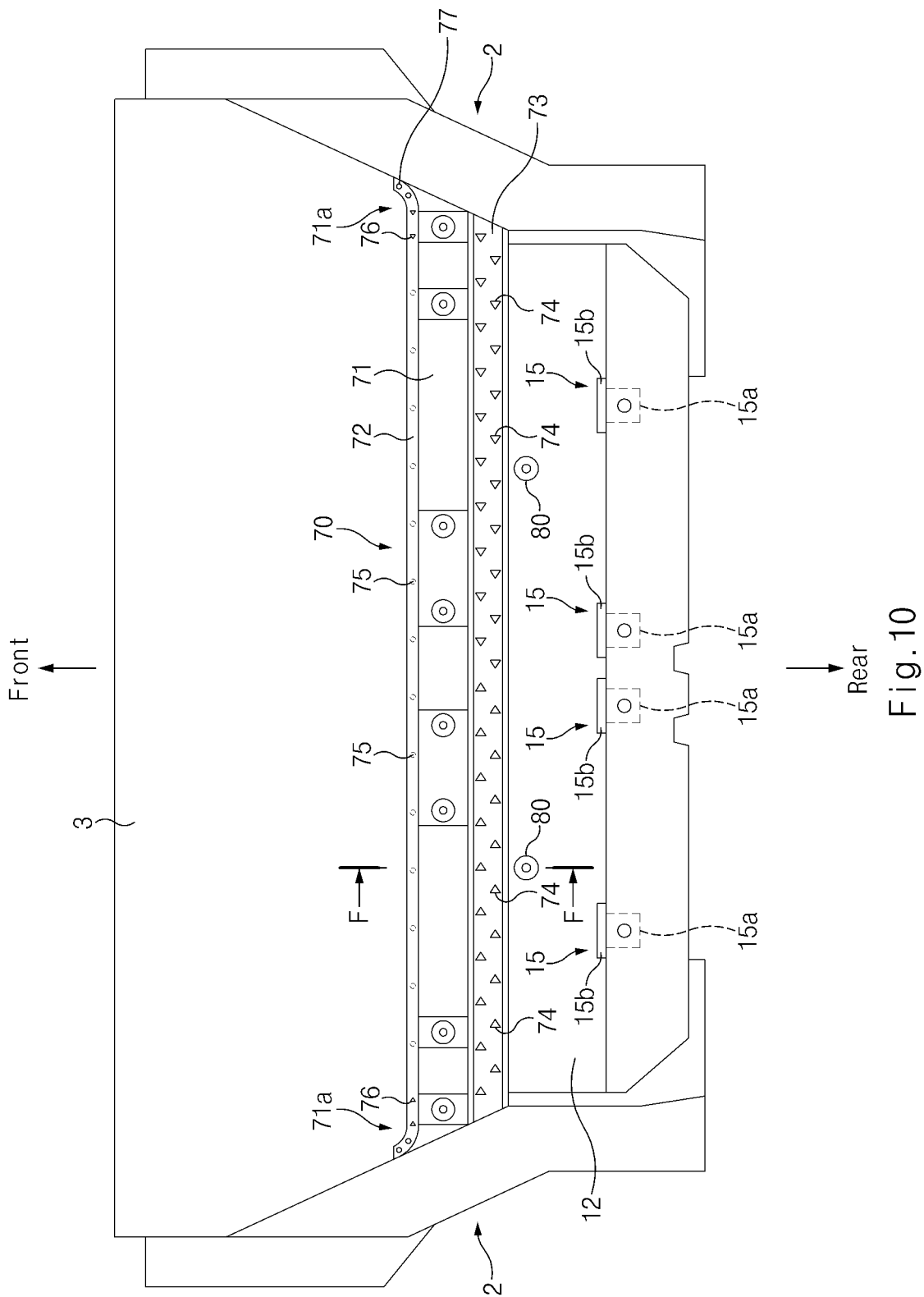
FIG. 10 is a top plan view of a second cross-member connected to a rear floor front panel in a vehicle rear structure according to the present disclosure.
Figure 11:
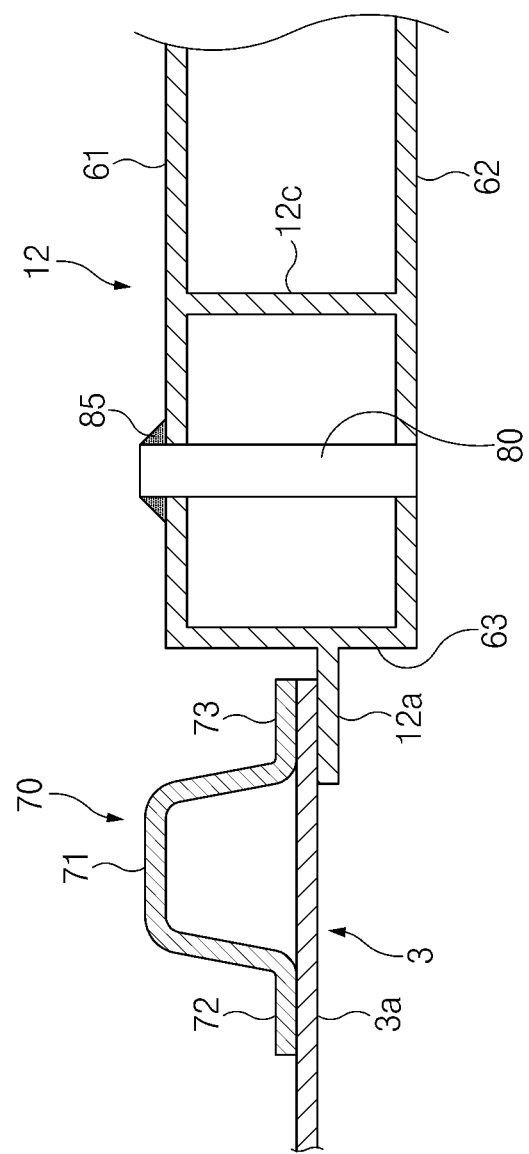
FIG. 11 is a cross-sectional view taken along line F-F in FIG. 10.

Referring to FIGS. 10 and 11, the second cross-member 12 may be connected to the rear floor front panel 3. Referring to FIG. 11, the front flange 12a of the second cross-member 12 may be fixed to the rear edge of the rear floor front panel 3 (e.g., by fastening, welding, bonding, etc.). A front cross-member 70 may be mounted on the rear edge of the rear floor front panel 3. The front cross-member 70 may comprise a channel portion 71, a front flange 72 provided at a front edge of the channel portion 71, and a rear flange 73 provided at a rear edge of the channel portion 71. The rear flange 73 of the front cross-member 70 may be fixed to an upper surface of the rear edge 3a of the rear floor front panel 3. The front flange 12a of the second cross-member 12 may be fixed to a bottom surface of the rear edge 3a of the rear floor front panel 3. As described above, the front flange 12a of the second cross-member 12, the rear flange 73 of the front cross-member 70, and the rear edge 3a of the rear floor front panel 3 are coupled while triply overlapping one another. Therefore, it is possible to improve the connection rigidity between the second cross-member 12 and the front cross-member 70.

Referring to FIG. 10, the front flange 72 of the front cross-member 70 may be fixed to the upper surface of the rear floor front panel 3 (e.g., by one or more spot welds 75). The front flange 72 may have a pair of curved portions 72a provided at two opposite ends thereof. The curved portions 72a may each be curved toward the front of the vehicle rear structure 10. The curved portions 72a may be fixed to the upper surface of the rear floor front panel 3 (e.g., by one or more spot welds 76 and/or one or more self-piercing rivets (SPR) 77). Since the front flange 72 has the pair of curved portions 72a as described above, the number of fastening points may increase, such that the front flange 72 may be more securely mounted on the rear floor front panel 3.

The rear flange 73 of the front cross-member 70 may be fixed to the upper surface of the rear edge 3a of the rear floor front panel 3 (e.g., by one or more spot weld and/or by one or more SPRs 74). For example, the front cross-member 70 may be fixed to the upper surface of the rear edge 3a of the rear floor front panel 3 by a plurality of SPRs 74. The plurality of SPRs 74 may be arranged in two rows. The plurality of SPRs 74 may be arranged in a zigzag shape. Arranging the plurality of SPRs 74 in the zigzag shape may minimize a pitch between the SPRs 74, so that the rear flange 73 of the front cross-member 70 may be more securely mounted on the rear floor front panel 3.

Referring to FIG. 11, the second cross-member 12 may further comprise a penetration pipe 80 that penetrates the upper wall 61 and the bottom wall 62. An upper end of the penetration pipe 80 may be fixed to the upper wall 61 by one or more welds 85 (e.g., a metal inert gas weld). Since the penetration pipe 80 penetrates the upper wall 61 and the bottom wall 62 as described above, the bending rigidity of the second cross-member 12 in the longitudinal direction of the vehicle may be further improved by the penetration pipe 80.

For example, the penetration pipe 80 may be made of an aluminum material such as A6082MF.

The present disclosure provides a reinforced structural member and a vehicle rear structure comprising the same, in which a portion of a reinforcing structure is inserted into a structural member through a hole in the structural member, and the hole and the reinforcing structure are aligned with an associated component, which makes it possible to securely support the associated component mounted on the structural member and improve mounting rigidity of the associated component.

An example of the present disclosure provides a reinforced structural member comprising a structural member having a hole and having a closed cross-section extending in a longitudinal direction thereof, and a reinforcing structure fixed to the structural member. A portion of the reinforcing structure may be inserted into the structural member through the hole, and the hole and the reinforcing structure may be configured be aligned with a mount portion for an associated component mounted on the structural member.

As described above, a portion of the reinforcing structure may be inserted into the structural member through the hole, and the hole and the reinforcing structure may be aligned with the associated component. Therefore, it is possible to securely support the associated component mounted on the structural member and improve the mounting rigidity of the associated component. Further, since the reinforcing structure is mounted on the structural member through the hole, the rigidity of only a portion of the structural member (the portion on which the associated component is mounted) may be improved. Therefore, it is possible to optimize the structure for reinforcing the structural member and minimize the size and weight of the reinforcing structure. In particular, the hole provided in the structural member may have the minimum size that allows the insertion of the reinforcing structure, and the reinforcing structure may be formed only on the portion on which the mount portion of the associated component is mounted. Therefore, it is possible to minimize the size of the reinforcing structure and the size of the hole and improve the rigidity of the structural member because the reinforcing structure is fitted into the hole.

The structural member may comprise a first wall, and a second wall connected to the first wall at a predetermined angle, and the hole may be formed at a position adjacent to a corner between the first wall and the second wall.

As described above, the hole having the minimum size, which allows the insertion of the reinforcing structure, may be formed at the position adjacent to the corner between the first wall and the second wall, and the reinforcing structure may be fixed, through the hole, to the position adjacent to the corner between the first wall and the second wall. Therefore, the rigidity of the structural member may be improved by the reinforcing structure.

The reinforcing structure may comprise a first fixing portion fixed to the first wall, and a second fixing portion fixed to the second wall.

Since the reinforcing structure comprises the first fixing portion fixed to the first wall and the second fixing portion fixed to the second wall as described above, it is possible to improve the overall rigidity of the structural member.

The first fixing portion may be inserted into the structural member through the hole, and the first fixing portion may be fixed to the first wall of the structural member.

The rigidity of the first wall of the structural member may be improved since the first fixing portion is inserted into the structural member and the first fixing portion is fixed to the first wall.

An angle between the first fixing portion and the second fixing portion may be equal to an angle between the first wall and the second wall.

Since the angle between the first fixing portion and the second fixing portion is equal to the angle between the first wall and the second wall as described above, the reinforcing structure may be in tight contact with the structural member. Therefore, the first fixing portion of the reinforcing structure may be securely fixed to the first wall of the structural member, and the second fixing portion of the reinforcing structure may be securely fixed to the second wall of the structural member.

The reinforced structural member according to the example of the present disclosure may further comprise a mounting hardware component fixed to the first fixing portion.

Since the mounting hardware component is fixed to the first fixing portion as described above, the mount portion of the associated component, together with the first fixing portion, may be mounted on the first wall of the structural member by means of the mounting hardware component. Therefore, it is possible to improve the mounting rigidity of the associated component.

The structural member may be an extruded component having a uniform closed cross-section in a longitudinal direction thereof.

Since the reinforcing structure is mounted on the extruded component through the hole as described above, the rigidity of a portion of the extruded component may be improved. Therefore, it is possible to improve the mounting rigidity of the associated component mounted on the extruded component.

Another example of the present disclosure provides a vehicle rear structure comprising: a rear floor center panel; a first cross-member connected to a front side of the rear floor center panel and having a hole; a second cross-member positioned forward of the first cross-member and connected to a lower side of the first cross-member; and a third cross-member connected to a rear side of the rear floor center panel. A front portion of a seat base of a vehicle seat may be mounted on the first cross-member, a rear portion of the seat base of the vehicle seat may be mounted on the third cross-member, the first cross-member may have a hole, a reinforcing structure may be fixed to the first cross-member through the hole, a portion of the reinforcing structure may be inserted into the first cross-member through the hole, and the hole and reinforcing structure may be configured to be aligned with the front portion of the seat base mounted on the first cross-member.

Since the front portion of the seat base of the vehicle seat is mounted on the reinforcing structure of the first cross-member as described above, it is possible to sufficiently ensure the mounting rigidity of the vehicle seat. In particular, since the reinforcing structure is mounted on the first cross-member through the hole, the rigidity of only a portion of the first cross-member (the portion on which the front portion of the seat base is mounted) may be improved. Therefore, it is possible to optimize the structure for reinforcing the first cross-member and minimize the size and weight of the reinforcing structure. In particular, the hole and the reinforcing structure are provided only on the portion on which the front portion of the seat base is mounted. Therefore, it is possible to minimize the size of the hole and the size of the reinforcing structure and improve the rigidity of the first cross-member.

The first cross-member may comprise a first wall, and a second wall connected to the first wall at a predetermined angle. The reinforcing structure may comprise a first fixing portion fixed to the first wall, and a second fixing portion fixed to the second wall. The hole may be adjacent to a corner between the first wall and the second wall, and the first fixing portion may be inserted into the first cross-member through the hole.

Since the first fixing portion is inserted into the first cross-member and the first fixing portion is fixed to the first wall as described above, the rigidity of the first wall of the first cross-member may be improved.

A mounting hardware component may be fixed to the first fixing portion of the reinforcing structure, and the front portion of the seat base, together with the first fixing portion of the reinforcing structure, may be fixed to the first wall of the first cross-member by means of the mounting hardware component.

Since the front portion of the seat base, together with the first fixing portion, may be fixed to the first wall of the first cross-member by means of the mounting hardware component as described above, it is possible to improve the mounting rigidity of the seat base.

The vehicle rear structure according to the example of the present disclosure may further comprise a support member disposed below the rear floor center panel, in which the support member extends along a longitudinal central axis of the rear floor center panel, and the support member is configured to connect the first cross-member and the third cross-member.

The support member may have a front flange fixed to the first cross-member, and a rear flange fixed to the third cross-member.

As described above, the support member may be disposed below the rear floor center panel and connect the first cross-member and the third cross-member. Therefore, the support member may improve the structural rigidity and strength of the vehicle rear structure and reduce vibration of the rear floor center panel.

A rear floor front panel may be positioned forward of the rear floor center panel, the second cross-member may be connected to the rear floor front panel, a front cross-member may be mounted at a rear edge of the rear floor front panel, the second cross-member may have a reinforcing rib formed therein, and the reinforcing rib may extend in a width direction of a vehicle.

Since the second cross-member has the reinforcing rib extending in the width direction of the vehicle as described above, the longitudinal bending rigidity of the second cross-member may be improved.

A front flange of the second cross-member may be fixed to a bottom surface of the rear edge of the rear floor front panel, and a rear flange of the front cross-member may be fixed to an upper surface of the rear edge of the rear floor front panel.

As described above, the front flange of the second cross-member, the rear flange of the front cross-member, and the rear edge of the rear floor front panel are coupled while triply overlapping one another. Therefore, it is possible to improve the connection rigidity between the second cross-member and the front cross-member.

The rear flange of the front cross-member may be fixed to the upper surface of the rear edge of the rear floor front panel by means of a plurality of SPRs, and the plurality of SPRs may be arranged in a zigzag shape.

Since the plurality of SPRs is arranged in a zigzag shape as described above, the pitch between the SPRs may be minimized. The rear flange of the front cross-member, the front flange of the second cross-member, and the rear edge of the rear floor front panel are triply coupled, such that the rear flange of the front cross-member may be more securely mounted on the rear floor front panel and the second cross-member.

The third cross-member may have a groove formed at a central portion thereof, and a center reinforcing structure may be mounted on the third cross-member through the groove.

The third cross-member may comprise a first wall, and a second wall connected to the first wall at a predetermined angle. The groove may be formed in the first wall of the third cross-member, and the center reinforcing structure may comprise a first fixing portion accommodated in and fixed into the groove, and a second fixing portion fixed to the second wall.

As described above, the first fixing portion of the center reinforcing structure may be fixed to the third cross-member through the groove, and the groove and the center reinforcing structure may be aligned with the rear portion of the seat base. Therefore, it is possible to securely support the rear portion of the seat base mounted on the third cross-member and improve the mounting rigidity of the rear portion of the seat base. Further, since the center reinforcing structure is mounted on the third cross-member through the groove, it is possible to improve the rigidity of the central portion of the third cross-member, simplify the structure for reinforcing the third cross-member, reduce the weights of the center reinforcing structure and the third cross-member, and simplify the assembly process. In particular, the groove may be formed only at the position aligned with the rear portion of the seat rail. Therefore, it is possible to significantly reduce the size of the groove and prevent or minimize initiation of cracks from the groove. Further, since the first fixing portion of the center reinforcing structure is accommodated in and fixed into the groove, the rigidity of the third cross-member may be improved.

A mounting hardware component may be fixed to the first fixing portion of the center reinforcing structure, the first wall of the third cross-member may have a through-hole having a larger diameter than the mounting hardware component, the mounting hardware component may be accommodated in the through-hole, and the rear portion of the seat base may be fixed to the first fixing portion of the center reinforcing structure by means of the mounting hardware component. The center reinforcing structure and the third cross-member may be joined by an FDS.

Therefore, the center reinforcing structure may be securely fixed to the first wall of the third cross-member. The rear portion of the seat base may be securely mounted on the first fixing portion of the center reinforcing structure by means of the mounting hardware component.

The third cross-member may comprise two side holes symmetrically disposed at two opposite sides of the groove. Two side reinforcing structures may be independently fixed to the third cross-member through the two side holes.

According to the present disclosure, a portion of the reinforcing structure may be inserted into the structural member through the hole, and the hole and the reinforcing structure may be aligned with the associated component. Therefore, it is possible to securely support the associated component mounted on the structural member and improve the mounting rigidity of the associated component. The above description is simply given for illustratively describing the technical spirit of the present disclosure, and those skilled in the art to which the present disclosure pertains will appreciate that various changes and modifications are possible without departing from the essential characteristic of the present disclosure.

Therefore, the examples disclosed in the present disclosure are provided for illustrative purposes only but not intended to limit the technical spirit of the present disclosure. The scope of the technical spirit of the present disclosure is not limited thereby. The protective scope of the present disclosure should be construed based on the following claims, and all the technical spirit in the equivalent scope thereto should be construed as falling within the scope of the present disclosure.

What is claimed is:
1. A reinforced structural member comprising:
a structural member comprising one or more walls that form a closed cross-section, wherein the one or more walls form a hole; and
a reinforcement fixed to the structural member,
wherein a portion of the reinforcement is inserted into the structural member through the hole, and wherein the hole and the reinforcement are configured to be aligned with a mount portion of an associated component when the associated component is mounted on the structural member,
wherein the one or more walls comprise a first wall and a second wall connected to the first wall at an angle,
wherein the reinforcement comprises:
a first fixing portion fixed to an inner surface of the first wall, and
a second fixing portion fixed to an outer surface of the second wall, and
wherein the first fixing portion is inserted into the structural member through the hole.

2. The reinforced structural member of claim 1, wherein the hole is formed at a position adjacent to a connection between the first wall and the second wall.

3. The reinforced structural member of claim 1, wherein an angle between the first fixing portion and the second fixing portion is equal to the angle between the first wall and the second wall.

4. The reinforced structural member of claim 1, further comprising:
a mounting hardware component fixed to the first fixing portion.

5. The reinforced structural member of claim 1, wherein the structural member is an extruded component having a substantially uniform closed cross-section in a direction of extrusion.

6. The reinforced structural member of claim 1, wherein the second fixing portion fixed to the outer surface of the second wall is exposed to an outside of the structural member.

7. A vehicle rear structure comprising:
a rear floor center panel;
a first cross-member connected to a front side of the rear floor center panel;
a second cross-member positioned forward of the first cross-member and connected to a lower side of the first cross-member; and
a third cross-member connected to a rear side of the rear floor center panel,
wherein the first cross-member is configured to accept mounting of a front portion of a seat base of a vehicle seat when the vehicle seat is mounted on the first cross-member,
wherein the third cross-member is configured to accept mounting of a rear portion of the seat base of the vehicle seat when the vehicle seat is mounted on the third cross-member,
wherein the first cross-member has a hole, and a reinforcement is fixed to the first cross-member through the hole,
wherein a portion of the reinforcement is inserted into the first cross-member through the hole, and
wherein the hole and the reinforcement are configured to be aligned with the front portion of the seat base when the vehicle seat is mounted on the first cross-member.

8. The vehicle rear structure of claim 7, wherein the first cross-member comprises:
a first wall; and
a second wall connected to the first wall at a first angle,
wherein the reinforcement comprises:
a first fixing portion fixed to the first wall; and
a second fixing portion fixed to the second wall,
wherein the hole is adjacent to a corner between the first wall and the second wall, and
wherein the first fixing portion is inserted into the first cross-member through the hole.

9. The vehicle rear structure of claim 8, wherein a mounting hardware component is fixed to the first fixing portion of the reinforcement, and
wherein the mounting hardware component is configured to accept mounting of the front portion of the seat base.

10. The vehicle rear structure of claim 7, further comprising:
a support member disposed below the rear floor center panel,
wherein the support member is configured to connect the first cross-member and the third cross-member.

11. The vehicle rear structure of claim 10, wherein the support member comprises:
a front flange fixed to the first cross-member, and
a rear flange fixed to the third cross-member.

12. The vehicle rear structure of claim 7, wherein a rear floor front panel is positioned forward of the rear floor center panel,
wherein the second cross-member is connected to the rear floor front panel,
wherein a front cross-member is mounted at a rear edge of the rear floor front panel, and
wherein the second cross-member comprises a reinforcing rib formed therein.

13. The vehicle rear structure of claim 12, wherein a front flange of the second cross-member is fixed to a bottom surface of the rear edge of the rear floor front panel, and
wherein a rear flange of the front cross-member is fixed to an upper surface of the rear edge of the rear floor front panel.

14. The vehicle rear structure of claim 13, wherein the rear flange of the front cross-member is fixed to the upper surface of the rear edge of the rear floor front panel by means of a plurality of self-piercing rivets, and
wherein the plurality of self-piercing rivets is arranged in a zigzag shape.

15. The vehicle rear structure of claim 7, wherein the third cross-member has a groove formed at a central portion thereof, and a center reinforcement is mounted on the third cross-member through the groove.

16. The vehicle rear structure of claim 15, wherein the third cross-member comprises:
a first wall; and
a second wall connected to the first wall at a second angle,
wherein the groove is formed in the first wall of the third cross-member, and
wherein the center reinforcement comprises:
a first fixing portion fixed to the groove; and
a second fixing portion fixed to the second wall.

17. The vehicle rear structure of claim 16, wherein a mounting hardware component is fixed to the first fixing portion of the center reinforcement,
wherein the first wall of the third cross-member has a through-hole having a larger diameter than the mounting hardware component,
wherein the mounting hardware component is accommodated in the through-hole, and
wherein the rear portion of the seat base is fixed to the first fixing portion of the center reinforcement by means of the mounting hardware component.

18. The vehicle rear structure of claim 15, wherein the third cross-member further comprises two side holes disposed at two opposite sides of the groove, and wherein two side reinforcements are independently fixed to the third cross-member through the two side holes.

* * * * *